United States Patent
Chiu et al.

(10) Patent No.: US 9,933,946 B2
(45) Date of Patent: Apr. 3, 2018

(54) FIBRE CHANNEL STORAGE ARRAY METHODS FOR PORT MANAGEMENT

(71) Applicant: HEWLETT PACKARD ENTERPRISE DEVELOPMENT LP, Houston, TX (US)

(72) Inventors: Evan Chiu, Durham, NC (US); Naveen Bali, Durham, NC (US); Tao Jin, Durham, NC (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 104 days.

(21) Appl. No.: 14/802,817

(22) Filed: Jul. 17, 2015

(65) Prior Publication Data
US 2016/0077738 A1 Mar. 17, 2016

Related U.S. Application Data (60) Provisional application No. 62/050,680, filed on Sep. 15, 2014.

(51) Int. Cl.
*G06F 3/06* (2006.01)
*G06F 13/42* (2006.01)
(Continued)

(52) U.S. Cl.
CPC ............ *G06F 3/061* (2013.01); *G06F 3/067* (2013.01); *G06F 3/0611* (2013.01);
(Continued)

(58) Field of Classification Search
CPC ............................ G06F 3/0635; G06F 3/0619
See application file for complete search history.

(56) References Cited

U.S. PATENT DOCUMENTS

| 6,594,709 B1 * | 7/2003 | Agasaveeran | G06F 9/54 370/235 |
| 7,467,191 B1 | 12/2008 | Wang et al. | 709/221 |

(Continued)

OTHER PUBLICATIONS

PCT/US2015/047535, Nov. 27, 2015, Form PCT/ISA/210, International Search Report.
(Continued)

*Primary Examiner* — Farley Abad
(74) *Attorney, Agent, or Firm* — Martine Penilla Group, LLP (57) ABSTRACT

Methods and systems for processing failover operations in a storage array configured for Fiber Channel communication are provided. One example method includes executing a primary process in user space of a controller of the storage array. The primary process is configured to process request commands from one or more initiators and has access to a volume manager for serving data input/output (I/O) requests. The primary process has a connection to a port of storage array when in operation. The method further executes a secondary process in the user space of the controller to process request commands from one or more of the initiators. The secondary process is not provided access to the volume manger and is provided access to data for responding to non-I/O requests. The secondary process is not provided a connection to the port when the primary process is in operation. The second process is configured to detect that the primary process has entered a state of non-operation, and in response performing a port grab of the port by the secondary process. The method further includes causing a replay of in-progress commands that were being executed by the primary process before entering the state of non-operation and deleting the in-progress commands. The method continues to execute the secondary process while the primary process is in the non-operation state.

23 Claims, 8 Drawing Sheets

(51) Int. Cl.
*G06F 13/40* (2006.01)
*G06F 11/00* (2006.01)

(52) U.S. Cl.
CPC .......... *G06F 3/0617* (2013.01); *G06F 3/0619* (2013.01); *G06F 3/0631* (2013.01); *G06F 3/0635* (2013.01); *G06F 3/0659* (2013.01); *G06F 3/0665* (2013.01); *G06F 3/0685* (2013.01); *G06F 3/0689* (2013.01); *G06F 11/00* (2013.01); *G06F 13/4027* (2013.01); *G06F 13/426* (2013.01); *G06F 13/4282* (2013.01)

(56) References Cited

U.S. PATENT DOCUMENTS

| | | | |
|---|---|---|---|
| 8,626,967 B1 * | 1/2014 | Naik | G06F 13/14 710/31 |
| 2003/0004952 A1 | 1/2003 | Nixon et al. | |
| 2003/0126225 A1 | 7/2003 | Camble et al. | |
| 2003/0131182 A1 | 7/2003 | Kumar et al. | |
| 2005/0033916 A1 | 2/2005 | Dellacona | 711/114 |
| 2005/0055606 A1 | 3/2005 | Kutan et al. | |
| 2005/0259632 A1 | 11/2005 | Malpani et al. | 370/351 |
| 2008/0133942 A1 | 6/2008 | Ogasawara et al. | 713/300 |
| 2011/0116362 A1 | 5/2011 | Singatwaria et al. | |
| 2013/0066837 A1 | 3/2013 | Colrain et al. | 707/674 |
| 2014/0244936 A1 | 8/2014 | Maharana et al. | |

OTHER PUBLICATIONS

United States Patent and Trademark Office, Non-final Office Action, dated May 23, 2017, issued in US App No. 12/846,689.
International Searching Authority, "Written Opinion of the International Searching Authority," dated Nov. 27, 2015, issued in International Application No. PCT/US2015/047535.
The International Bureau of WIPO, "International Preliminary Report on Patentability," dated Mar. 21, 2017. issued in International Application No. PCT/US2015/047535.
United States Patent and Trademark Office, Non-final Office Action, dated May 23, 2017, issued in U.S. Appl. No. 14/846,689.

* cited by examiner

PORT ASSIGN
Delegation to DSD

Fig. 4A

PORT GRAB
Delegation to SFD

Fig. 4B

PORT GRAB
Re-delegation to DSD

FIBRE CHANNEL STORAGE ARRAY METHODS FOR PORT MANAGEMENT

CLAIM OF PRIORITY

This application claims priority from U.S. Provisional Patent Application No. 62/050,680, filed on Sep. 15, 2014, entitled "Fibre Channel Storage Array Systems and Methods," which is herein incorporated by reference.

BACKGROUND

1. Field of the Invention

The present embodiments relate to methods, systems, and programs for managing port assignments to user space processes that carry out processing as requested by initiator(s), and methods for managing port assignments (e.g., port grabs) so that connections remain active from the viewpoint of initiators.

2. Description of the Related Art

Network storage, also referred to as network storage systems or storage systems, is computer data storage connected to a computer network providing data access to heterogeneous clients. Typically network storage systems process a large amount of Input/Output (I/O) requests, and high availability, speed, and reliability are desirable characteristics of network storage.

One way to provide quick access to data is by utilizing fast cache memory to store data. Since the difference in access times between a cache memory and a hard drive are significant, the overall performance of the system is highly impacted by the cache hit ratio. Therefore, it is important to provide optimal utilization of the cache memory in order to have in cache the data that is accessed most often.

There is also a need for storage systems that operate Fibre Channel networks, to provide fault tolerant connection to initiators. If initiators see storage arrays with excessive failures, even when a storage array is processing failover procedures, such storage arrays will be viewed as less than optimal. A need therefore exists for a storage array that is capable of handling failover operations while providing initiators with consistent connections to such storage arrays.

It is in this context that embodiments arise.

SUMMARY

Methods and storage systems for processing failover operations in a storage array configured for Fibre Channel communication are provided.

In one embodiment, a method includes executing a primary process in user space of a controller of the storage array. The primary process is configured to process request commands from one or more initiators and has access to a volume manager for serving data input/output (I/O) requests. The primary process has a connection to a port of storage array when in operation. The method further executes a secondary process in the user space of the controller to process request commands from one or more of the initiators. The secondary process is not provided access to the volume manger and is provided access to data for responding to non-I/O requests. The secondary process is not provided a connection to the port when the primary process is in operation. The secondary process is configured to detect that the primary process has entered a state of non-operation, and in response performing a port grab of the port by the secondary process. The method further includes causing a replay of in-progress commands that were being executed by the primary process before entering the state of non-operation and deleting the in-progress commands. The method continues to execute the secondary process while the primary process is in the non-operation state.

In another embodiment, a storage array is disclosed. The storage array includes a controller of the storage array configured to operate a Fibre Channel protocol. The controller includes memory and a processor. The processor is configured to execute a driver and user-space processes that include a primary process and a secondary process. The user-space processes are configured to process SCSI events for the driver to service one or more IT Nexus connections for one or more initiators. A port of the driver is assigned to the primary process to execute input/output (I/O) requests to the storage array from the one or more initiators. When the primary process fails to operate, the secondary process performs a port grab of the port and the driver allows the secondary process to perform the port grab since the primary process is not operational. The secondary process executes limited requests that do not include I/O requests to the storage array, and the port grab by the secondary process maintains the one or more IT Nexus connections active between the storage array and the one or more initiators.

In yet another embodiment, a method for processing failover operations in a storage array configured for Fibre Channel communication is disclosed. The method includes executing a primary process in user space of a controller of the storage array. The primary process is configured to process request commands from one or more initiators via one or more connections. The primary process connects to a port of the storage array when in operation. The method further includes executing a secondary process in the user space of the controller. The secondary process is configured to process request commands from one or more of the initiators. The secondary process does not have a connection to the port when the primary process is in operation. The method also includes detecting that the primary process has entered a state of non-operation. In response allowing the secondary process to perform a port grab of the port while maintaining the one or more connections. The method then resumes execution by the secondary process while the primary process is in the non-operation state.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods, devices, systems, and computer programs for storage arrays, which are configured for network connectivity in accordance with one or more protocols. One example method is configured to process operations for handling failover operations in the context of a storage array configured for Fibre Channel communication. The method includes executing a primary process in user space of a controller of the storage array. The primary process is configured to process request commands from one or more initiators via one or more connections (e.g., I_T Nexus connections, e.g., connections in the context of Fibre Channel between initiator(s) and the storage array (e.g., target)). The primary process connects to a port of the storage array when in operation. The method further includes executing a secondary process in the user space of the controller. The secondary process, when enabled, is configured to process request commands from one or more of the initiators. The secondary process does not have a connection to the port when the primary process is in operation. The method includes detecting that the primary process has entered a state of non-operation, e.g., crash or shut-down. In response to this detection, the secondary process is allowed to perform a port grab of the port while maintaining the one or more connections. In this manner, to initiators, the connections to the target storage array will appear to always be up and operating. The method then resumes execution by the secondary process while the primary process is in the non-operation state. As described below, when the primary process returns to operation, the primary process is allowed to force a port grab and regain its role as primary process.

More detail regarding the port grab processes, methods and systems will be provided with reference to FIGS. 3-6B below.

It should be noted that various embodiments described in the present disclosure may be practiced without some or all of these specific details. In other instances, well known process operations have not been described in detail in order not to unnecessarily obscure various embodiments described in the present disclosure.

One protocol is iSCSI (Internet Small Computer System Interface). iSCSI is used for interconnecting storage arrays to a network, which enables the transport of SCSI commands over Ethernet connections using TCP/IP (i.e., for IP networks). In such configurations, an iSCSI storage implementation can be deployed using Ethernet routers, switches, network adapters, and cabling.

Another protocol is Fibre Channel. Fibre Channel is a high-speed network technology, which is primarily utilized in storage array networks (SANs). Storage arrays are the target devices in a SAN configuration, wherein the fabric and initiators all intercommunicate using the Fibre Channel protocol. Fibre Channel Protocol (FCP) is a transport protocol (similar to TCP used in IP networks) that predominantly transports SCSI commands over Fibre Channel networks.

In accordance with various embodiments described herein, a storage array configurable for Fibre Channel mode or iSCSI mode is provided. The storage array can include logic and hardware to operate in the iSCSI mode and can implement one or more Ethernet cards. To operate in the Fibre Channel mode, the storage array is provided with a Fibre Channel (FC) card (e.g., a hardware card of the controller). The FC card is the link between the Fibre Channel physical network (i.e., PHY) and the Fibre Channel driver (FC) driver of the storage array.

Figure 1A:
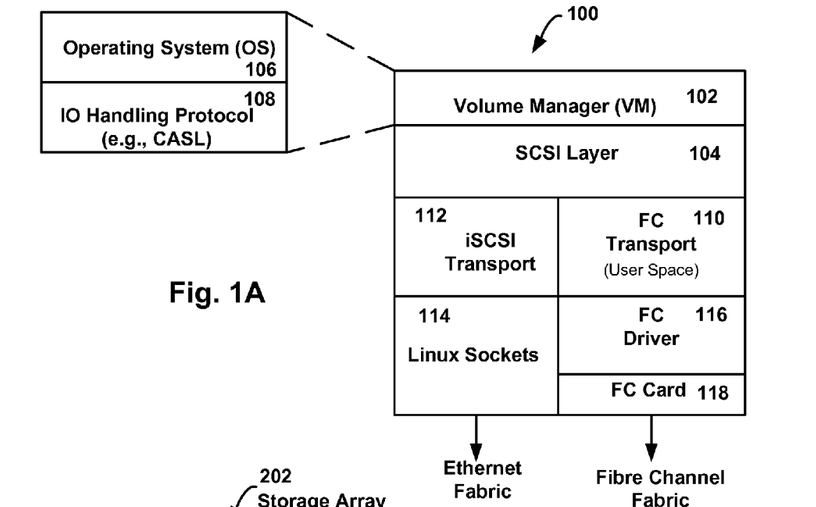
FIG. 1A provides one example view of a storage array SCSI target stack, in accordance with one embodiment.

FIG. 1A provides one example view of a storage array SCSI target stack 100. The stack includes a volume manager (VM) 102, which broadly includes the operating system (OS) 106 of the storage array and an I/O handling protocol that processes read and write I/O commands to storage of the storage array. The I/O handling protocol, in one embodiment, is referred to herein as a cache accelerated sequential layout (CASL) process, which intelligently leverages unique properties of flash and disk of the storage array to provide high performance and optimal use of capacity. CASL functions as the file system of the array, albeit processing is generally performed at the block level instead of file level.

Below the VM 102 is a SCSI layer 104, which is configured to handle SCSI commands. In one embodiment, the SCSI layer 104 has been implemented to be independent of iSCSI transport functionality. For example, in storage arrays configured for pure iSCSI mode operation, the iSCSI transport 112 may include logic that is shared by the SCSI layer 104. However, to implement a Fibre Channel operating storage array, the SCSI layer 104 has been implemented to remove dependencies on the iSCSI transport 112. The SCSI target stack 100 further includes a Fibre Channel (FC) transport 110, which functions as user space for running various processes, which are referred to herein as daemons. The user-space of the FC transport 110 serves as the conduit to the SCSI target (i.e., SCSI layer 104).

A Fibre Channel (FC) driver 116 is further provided, which is in communication with a Fibre Channel (FC) card 118. In one embodiment, in order to interact with the FC card 118, which is a dedicated hardware/firmware, a dedicated FC driver 116 is provided. For each FC card 118 (i.e., port) in an array, an instance of the FC driver 116 is provided. The FC driver 116 is, in one embodiment, a kernel level driver that is responsible for interacting directly with the FC card 118 to retrieve incoming SCSI commands, request data transfer, and send SCSI responses, among other things. In one embodiment, the FC card 118 may be an adapter card, which includes hardware, firmware and software for processing Fibre Channel packets between the Fibre Channel fabric and the FC driver. In one specific example, the FC card 118 may be a Fibre Channel Host Bus Adapter (HBA) card, available from Emulex Corporation, located in Costa Mesa, Calif. It should be understood that the brand and type of HBA card is only one example, and other brands and types of cards may be used. If the storage array is configured for iSCSI mode, Linux sockets are used to communicate with a TCP/IP network interface card (NIC), for communication with an Ethernet fabric.

Figure 1B:
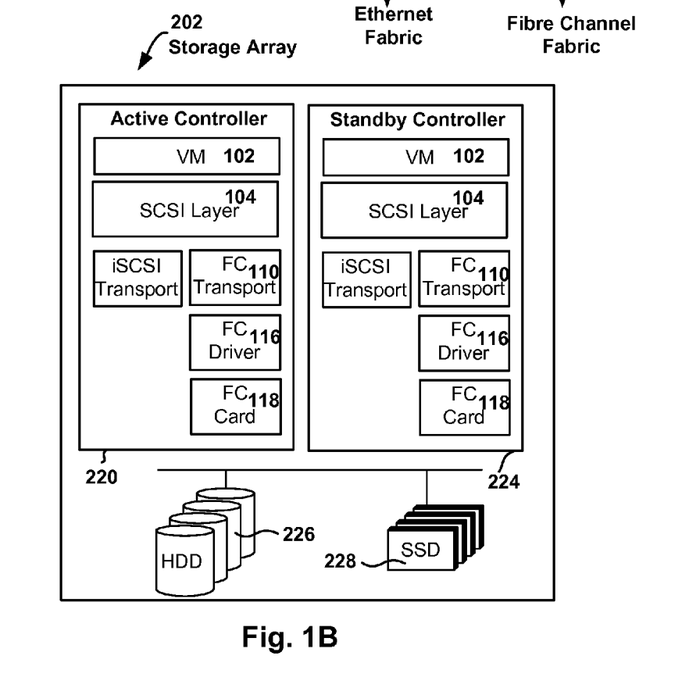
FIG. 1B illustrates an example of a storage array having an active controller and a standby controller, in accordance with one embodiment.

FIG. 1B illustrates an example of a storage array 202, which includes an active controller 220, a standby controller 224, and storage (i.e., hard disk drives (HDDs) 226, and solid state drives (SSDs) 228). This configuration shows the storage array SCSI target stack 100 usable in each of the active and standby controllers 220 and 224, depending on the state of operation. For example, if the active controller 220 is functioning normally, the standby controller is not serving IOs to and from the storage, and ports of the standby controller are simply operational in a standby (SB) state in accordance with an asymmetric logical unit access (ALUA) protocol. The ALUA protocol is described in more detail in a Fibre Channel standard, entitled "*Information technology—SCSI Primary Commands*-4 (SPC-4)", revision 36s, dated 21 Mar. 2014 (Project T10/BSR INCITS 513), which is incorporated herein by reference. Generally speaking, ALUA is a multi-pathing method that allows each port (e.g., Linux-I/O Target) to manage access states and path attributes using assignments that include: (a) active/optimized (AO); (b) active/non-optimized (ANO); (c) standby (SB); unavailable (UA); and (d) logical block dependent (LBD).

In the example of FIG. 1B, it is noted that the standby controller 224 may not have the iSCSI transport 112 during the time it operates as a "standby" controller. If failover occurs and the standby controller 224 becomes the active controller 220, then the iSCSI transport 112 will be populated. Note also, that during Fibre Channel operation, the FC transport 110 is the module that is in operation. Alternatively, if the storage arrays are used in an iSCSI configuration, the iSCSI transport 112 will be needed, along with the Linux Sockets 114 to enable Ethernet fabric communication.

Figure 1C:
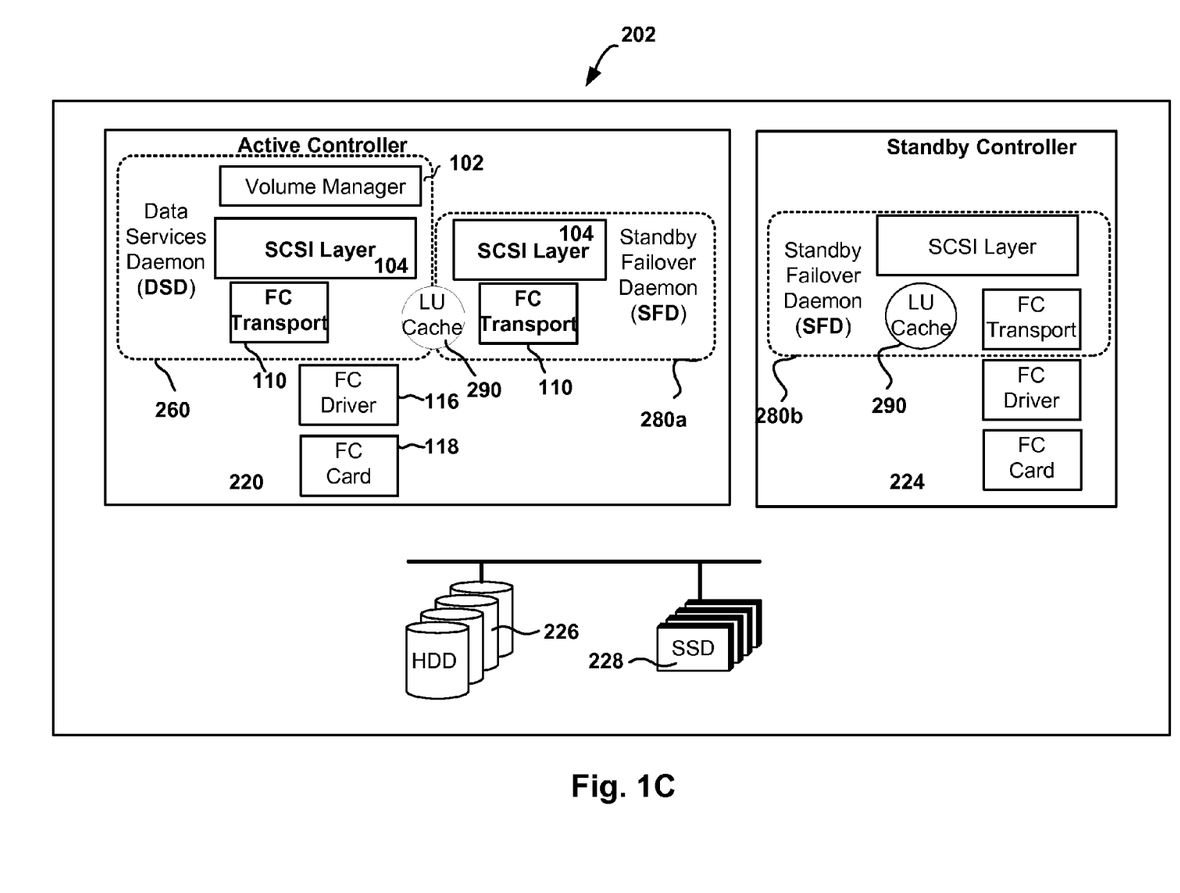
FIG. 1C shows an example of the active controller, which is configured with a data services daemon (DSD) and a standby failover daemon (SFD), in accordance with one embodiment.

FIG. 1C shows an example of the active controller 220, which is configured with a data services daemon (DSD) 260. DSD 260 is designed to provide full access to the storage array 202 via the VM 102, which includes serving IOs to the volumes of the storage array 202 (e.g., in response to initiator access requests to the SCSI target storage array 202). The DSD 260 of the active controller 220 is a user space process. For failover capabilities within the active controller 220 itself, the user space of the active controller 220 also includes a standby failover daemon (SFD) 280a. The SFD 280a is configured as a backup process that does not process IOs to the volumes of the storage array 202, but can provide limited services, such as responding to information SCSI commands while the DSD 260 is re-started (e.g., after a crash). In one embodiment, SFD may also be referred to as a SCSI failover and forwarding daemon.

If the SFD 280a takes over for the DSD 260, the I_T Nexus (i.e., connection) between initiators and the target array remain un-terminated. As will be described in more detail below in reference to a port-grab mechanism, during the transition between DSD 260 and SFD 280a, the FC driver 116 can transition between user space partner processes (e.g., DSD/SFD), without terminating the SCSI I_T_Nexus and forcing the initiator to reestablish its connection to the target.

The standby controller 224 of the storage array 202 is also configured with an SFD 280b in its user space. As noted above, the ports of the standby controller 224 are set to standby (SB) per ALUA. If a command is received by the SFD of the standby controller, it can process that command in one of three ways. In regard to a first way, for many commands, including READ and WRITE, the SCSI standard does not require the target to support the operation. For this case, SFD 280b returns the SCSI response prescribed by the standard to indicate non-support. In a second way, among the mandatory-to-support SCSI commands, there are certain commands for which initiators expect quick response under all conditions, including during failover.

Examples include, without limitation, INQUIRY, REPORT_LUNS, and REPORT_TARGET_PORT_GROUPS. For these commands, SFD 280b responds locally and independently. In a third way, for other mandatory-to-support SCSI commands (such as PERSISTENT_RESERVATION_IN/OUT), the SFD 280b will depend on the DSD 260 process running on the active controller 220. Thus, a forwarding engine is used to forward SCSI commands from the standby controller 224 to the active controller 220. The active controller 220 will process the commands and send responses back to the standby controller 224, which will in turn send them to the initiator.

For commands that need to be processed locally, all information required to create an accurate and consistent SCSI response will be stored locally in an LU cache 290. As will be described in more detail below, a logical unit (LU) cache will be present on each of the active and standby controllers 220/224, and consistency methods ensure that all LU cache states are updated. The SFD 280a/b uses the LU cache 290 to independently respond to a small number of commands, such as Inquiry, Report LUNs and RTPG.

Furthermore, in Fibre Channel, each FC transport endpoint is identified by a Fibre Channel (FC) World Wide Node Name (WWNN) and World Wide Port Name (WWPN). It is customary and expected that all ports for a given target advertise the same single WWNN. The client OS storage stack will establish a single FC connection to each available FC transport endpoint (WWNN/WWPN pair). In some embodiments, the FC requires a separate WWNN/WWPN pair for each target, the single-LUN target model would require a separate WWNN/WWPN pair for each exported volume. It should be understood that Single-LUN target models are just one example, and other configurations that are not Single-Lun target may also be implemented in some configurations. In one example of storage array 202, it may have two FC transport endpoints for each of the active controller 220 and the standby controller 224. That is, the active controller 220 may have two ports (i.e., two WWNN/WWPN pairs), and the standby controller 224 may also have two ports (i.e., two WWNN/WWPN pairs). It should be understood that the configuration of the storage array 202 may be modified to include more or fewer ports.

The LUN mapping is configured to persistently store the mapping information and maintain consistency across reboots. The LUN mapping is stored in the LU cache 290. The DSD 260 and SFD 280a and 280b are provided with direct access to the LU cache 290. As will be described below in more detail, the LU cache 290 will also store inquiry data and port state information. In one embodiment, a GDD (Group Data Daemon) and a GMD (Group Management Daemon) will maintain LUN mapping information for each initiator. GDD, from SCSI perspective, is configured to work with SCSI layer 104 to handle SCSI Reservation and TMF (task management function). In one embodiment, GDD will support iSCSI login and connection re-balancing for when the storage array 202 is configured/used as an iSCSI target.

It will be apparent, that the present embodiments may be practiced without some or all of these specific details. Modification to the modules, code and communication interfaces are also possible, so long as the defined functionality for the storage array or modules of the storage array is maintained. In other instances, well-known process operations have not been described in detail in order not to unnecessarily obscure the present embodiments.

Storage Array Example Structure

Figure 2:
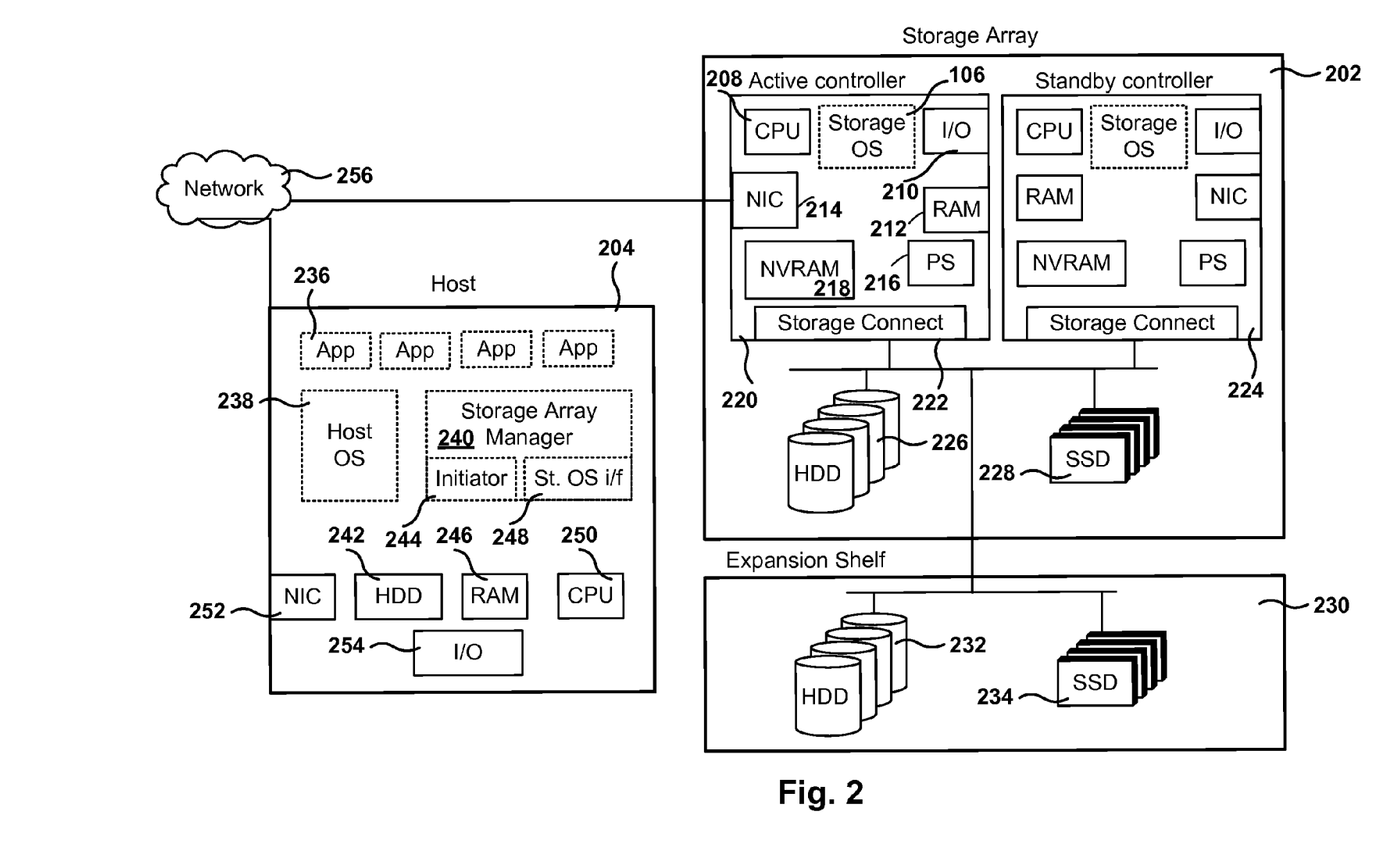
FIG. 2 illustrates an example architecture of a storage array, according to one embodiment.

FIG. 2 illustrates an example architecture of a storage array 102, according to one embodiment. In one embodiment, storage array 102 includes an active controller 220, a standby controller 224, one or more HDDs 226, and one or more SSDs 228. In one embodiment, the controller 220 includes non-volatile RAM (NVRAM) 218, which is for storing the incoming data as it arrives to the storage array. After the data is processed (e.g., compressed and organized in segments (e.g., coalesced)), the data is transferred from the NVRAM 218 to HDD 226, or to SSD 228, or to both.

In addition, the active controller 220 further includes CPU 208, general-purpose RAM 212 (e.g., used by the programs executing in CPU 208), input/output module 210 for communicating with external devices (e.g., USB port, terminal port, connectors, plugs, links, etc.), one or more network interface cards (NICs) 214 for exchanging data packages through network 256, one or more power supplies 216, a temperature sensor (not shown), and a storage connect module 222 for sending and receiving data to and from the HDD 226 and SSD 228. In one embodiment, the NICs 214 may be configured for Ethernet communication or Fibre Channel communication, depending on the hardware card used and the storage fabric. In other embodiments, the storage array 202 may be configured to operate using the iSCSI transport or the Fibre Channel transport.

Active controller 220 is configured to execute one or more computer programs stored in RAM 212. One of the computer programs is the storage operating system (OS) used to perform operating system functions for the active controller device. In some implementations, one or more expansion shelves 230 may be coupled to storage array 202 to increase HDD 232 capacity, or SSD 234 capacity, or both.

Active controller 220 and standby controller 224 have their own NVRAMs, but they share HDDs 226 and SSDs 228. The standby controller 224 receives copies of what gets stored in the NVRAM 218 of the active controller 220 and stores the copies in its own NVRAM. If the active controller 220 fails, standby controller 224 takes over the management of the storage array 202. When servers, also referred to herein as hosts, connect to the storage array 202, read/write requests (e.g., I/O requests) are sent over network 256, and the storage array 202 stores the sent data or sends back the requested data to host 204.

Host 204 is a computing device including a CPU 250, memory (RAM) 246, permanent storage (HDD) 242, a NIC card 252, and an I/O module 254. The host 204 includes one or more applications 236 executing on CPU 250, a host operating system 238, and a computer program storage array manager 240 that provides an interface for accessing storage array 202 to applications 236. Storage array manager 240 includes an initiator 244 and a storage OS interface program 248. When an I/O operation is requested by one of the applications 236, the initiator 244 establishes a connection with storage array 202 in one of the supported protocols (e.g., iSCSI, Fibre Channel, or any other protocol). The storage OS interface 248 provides console capabilities for managing the storage array 202 by communicating with the active controller 220 and the storage OS 106 executed therein. It should be understood, however, that specific implementations may utilize different modules, different protocols, different number of controllers, etc., while still being configured to execute or process operations taught and disclosed herein.

As discussed with reference to FIGS. 1A-1C, in a storage array 202, a kernel level process occurs at the FC driver 116, which is charged with communicating down with the Fibre Channel (FC) card 118. The FC card 118, itself includes firmware that provides the FC processing between the FC driver 116 and the physical network (PHY) or Fibre Channel fabric. In the illustrated configuration, the FC driver 116 is in direct communication with the user space, which includes the FC transport 110, the SCSI layer 104.

Figure 3:
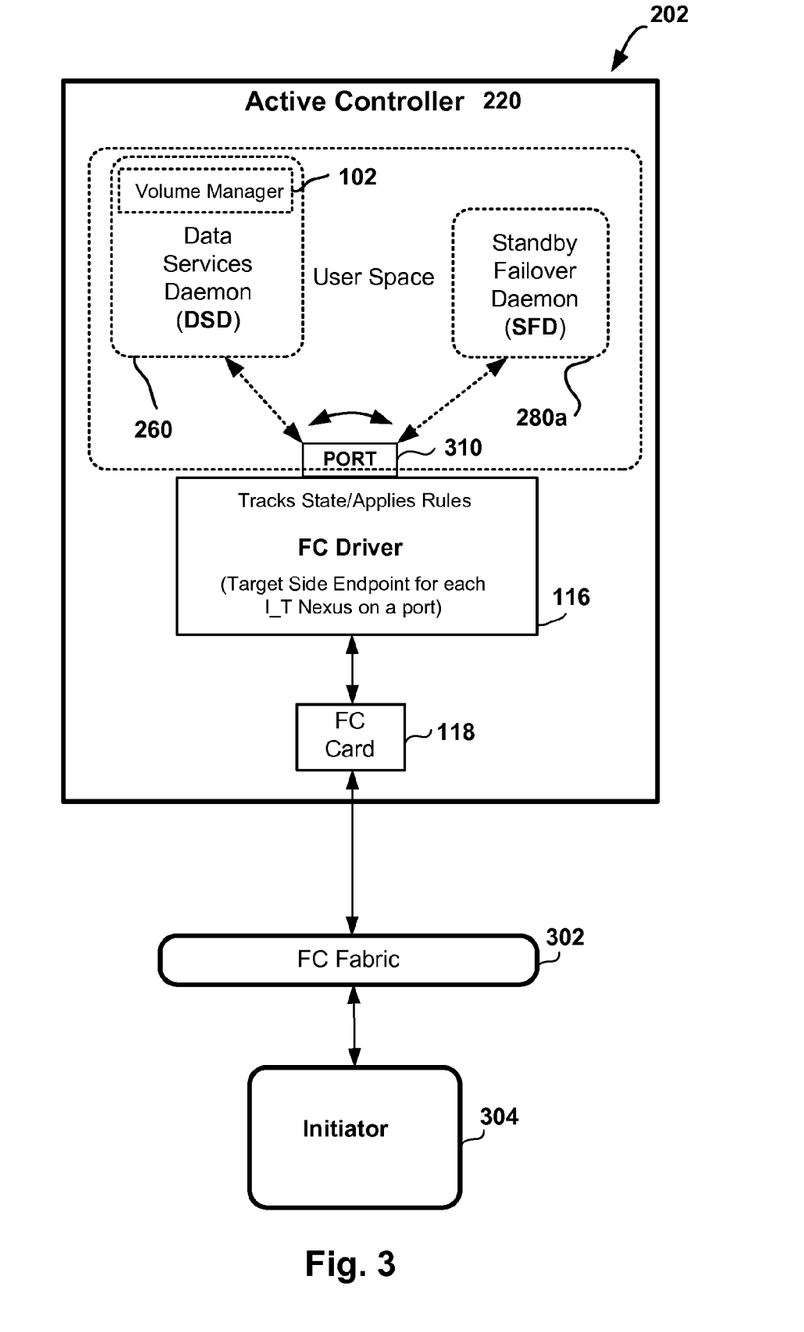
FIG. 3 shows a storage array that includes an active controller, with a driver that manages a port to delegate work to user space processes and enables port grab processing, in accordance with one embodiment.

FIG. 3 shows a storage array 202 that includes an active controller 220, and an associated logical configuration between a driver 116, the user spaces, and a Fibre channel card 118 of the storage array. Each controller, in one embodiment, will include two FC cards 118 (each providing a port 310), and a respective instance of the FC driver 116 is provided for each FC card 118 of each controller. For purposes of example, the active controller 220 is shown with a single FC card 118 that is in communication with the FC driver 116/port 310. As shown, in active controller 220, the user space may include a primary process (e.g., DSD 260) and a secondary process (e.g., SFD 280a). In normal operation by the active controller 220, the primary process in the user space is capable of servicing input/outputs (IOs) to the volumes of the storage array 220 via the VM 102, and is also capable of servicing inquiries regarding the array configuration from initiators, such as initiator 304. Initiator 304 is shown connected to Fibre Channel (FC) fabric 302, which is in turn interconnected to the FC card 118 of the storage array 202 (which is a SCSI target). However, the secondary process (e.g., SFD 280a) is not, in this example, able to service IOs, but is able to service certain configuration inquiries.

In one configuration, the DSD 260 is set to be ALUA Active/Optimized, while the SFD 280a is set to be ALUA Transitioning. For example, at all times, the FC driver 116 for a port 310 serves as the target-side endpoint for each SCSI I_T_Nexus on that port 310. The FC driver 116 maintains, in cache memory, some state for each I_T_Nexus, and also some state for each SCSI command and task management function in progress on that I_T_Nexus. In one embodiment, the FC driver 116 delegates, to some partner user-space process (primary or secondary), the work of processing SCSI events: SCSI I_T_Nexus create/destroy, new SCSI commands, SCSI data phase completion, etc. During the time when the primary process is active, the driver delegates this work to the primary process (e.g., DSD 260). If the primary process crashes, there may be commands in flight (e.g., list of commands managed by the driver), which can now not be confirmed complete by the crashed primary process.

In one implementation, delegation to SFD 280a during DSD 260 crash may include the certain example implementation operations. For example, DSD 260 communicates to the FC driver 116 through a special file descriptor advertised by the FC driver 116 for this purpose. The DSD 260 opens the file descriptor and then performs a PORT_GRAB operation, asserting itself as the primary process (e.g., via force=true, or code). Therefore, before DSD 260 crashes, the FC driver 116 knows that the current user-space process is the primary process (i.e., DSD 260). When DSD 260 crashes, the FC driver 116 gets notified by the Linux OS (or other suitable OS) that the special file descriptor has been closed (e.g., automatically due to process crash). The FC driver 116 records the fact that there is now no user-space partner process. At this point, SFD 280a opens the driver's special file descriptor during its initialization, and then monitors the state of DSD 260. When SFD 280a detects that DSD 260 has crashed, SFD 280a performs PORT_GRAB with force=false code (to indicate that it is the secondary process). The FC driver 116 allows this secondary process to grab the ports (since the primary process is not around), and begins delegating the user-space work to this process (i.e., SFD 280a).

Then, after the port grab by SFD 280a, the FC driver 116 replays both: existing I_T_Nexuses and still-in-progress SCSI commands to its new user-space partner process (in this case, SFD 280a). The new user-space partner needs the I_T_Nexuses to be replayed, because SCSI commands (both replayed and new) are executed in the context of an I_T_Nexus.

In regard to replayed commands, one embodiment will act to terminate or process the replayed commands (e.g., in-flight commands). In another embodiment, e.g., a two-layer approach (kernel/user) would allow returning some SCSI response that immediately notifies the initiator 304 of the error, for quick retry. In either case, the initiator 304 eventually figures out that the command is not completed normally, and performs recovery actions, including retrying the failed commands.

In one embodiment, the secondary process (e.g., SFD 280a) may not be able to process all commands as can the primary process (e.g., DSD 260), e.g., data IOs. However, to an initiator, the PORT grab by the secondary process allows the port to remain available. In this manner, existing I_T_Nexuses can remain active, although with reduced functionality (e.g., functioning at an ALUA transitioning level). Thus, in this implementation, the FC driver 116 is able to process PORT GRABS, so that the FC driver 116 can transition between user space partner processes, without terminating the SCSI I_T_Nexus and forcing the initiator to reestablish its connection to the target.

In one configuration, when the primary process (e.g., DSD 260) recovers, the primary process is configured to communicate with the FC driver 116 to inform the FC driver 116 of the recovery. In addition, the primary process is configured to instruct the FC driver 116 that it will take over and PORT GRAB the port. The FC driver 116 will then delegate the port back to the primary process in the user space and take it away from the secondary process (e.g., SFD 280a) of the user space. In this configuration, the secondary process may too have commands in-flight, which are stored in memory managed by the FC driver 116. When the primary process PORT GRABS the port, the primary process will request a replay of the list of commands in memory and the primary process will terminate or process these commands.

In one configuration, the primary process should terminate these commands as they will remain in the command list in memory waiting to be acknowledged complete by the secondary process. However, since the secondary process has been stopped by the primary process during the PORT GRAB, the secondary process cannot acknowledge them complete and the primary process will terminate their status as it too does not know what their complete state may be. In an alternative embodiment, the in-process commands need not be terminated, but messages may be sent to enable processing or recovery of the in-process commands.

At this point, further commands by the driver via the port are processed and sent to the primary process in the user space. In this configuration, therefore, it is possible for the FC driver 116 to delegate the port to different user space processes and allow user space processes to PORT GRAB so that the port remains active and does not appear down to any initiator. Thus, existing I_T_Nexuses (connections from initiator to target) survive the transition.

Further, the FC driver 116 is configured with logic to understand which user level process takes priority over others. For example, the kernel OS can tell the driver when DSD 260 has gone down, so that SFD 280a can take over, and once DSD 260 is back up, DSD 260 can tell the FC driver 116 that it has priority over SFD 280a and that it will take over and port grab.

Figure 4A:
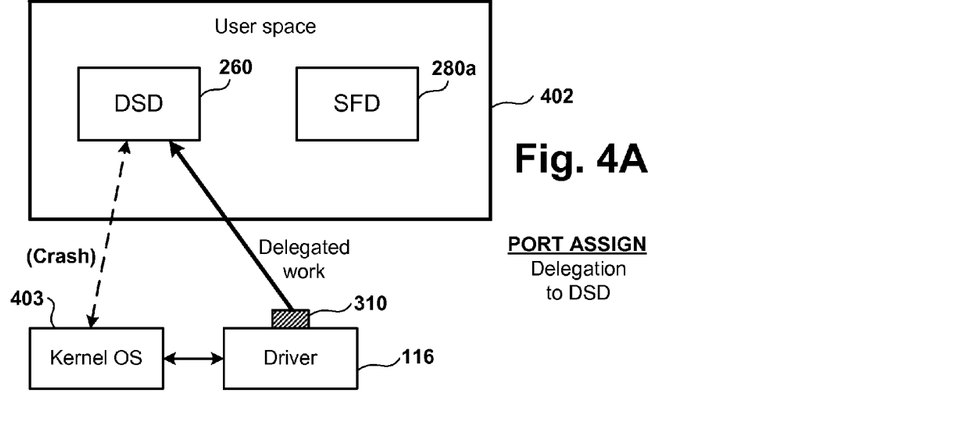
FIGS. 4A-4C illustrates a driver and its delegation of work to process SCSI events to the partner user-space process, and the port grab operations for enabling transitions during failover and returns from failover, in accordance with one embodiment.

FIG. 4A illustrates the driver 116 who has delegated work of processing SCSI events to the partner user-space process, namely DSD 260. While DSD 260 is operating, the delegation of work continues. When the kernel OS 403 notices that DSD 260 has crashed, the kernel OS is tasked with notifying the driver 116. Driver 116 will record that DSD 260 has crashed, which will enable SFD 280a to notice that DSD 260 is no longer running. As mentioned above, DSD 260 communicates to the driver 216 through a special file (e.g., a file or data structure) advertised by the driver for this purpose. Thus, if DSD 260 is active, it advertises that it is the primary process. In one embodiment, the file will include code indicating force=true. When the DSD 260 crashes, therefore, the driver 116 will get notified by the kernel OS that the special file has been closed. The driver records this fact, noting that there is no user-space partner.

Figure 4B:
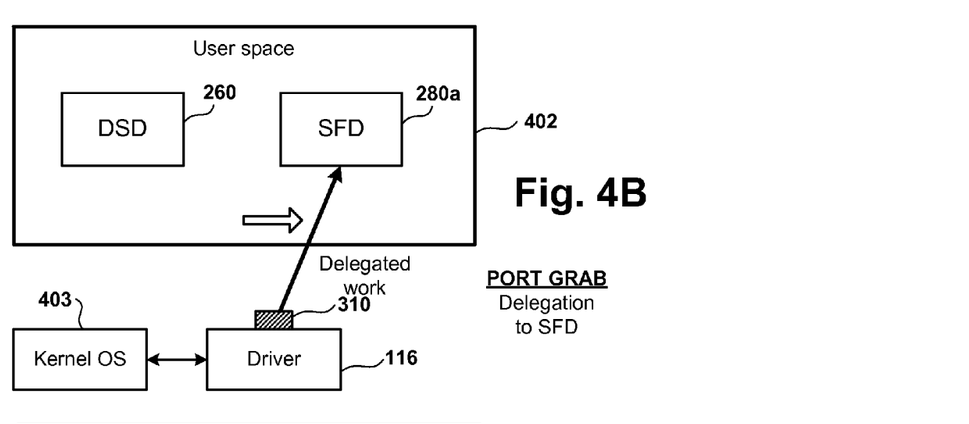

At this point, SFD 280a can open the driver's 116 special file during its initialization, wherein SFD 280a will detect that DSD 260 has crashed. SFD 280a will then perform a port grab of port 310, as shown in FIG. 4B. At port-grab, SFD will set force=false, to indicate that it is the secondary process. As noted above, the driver 116 will allow the port grab of port 310 since DSD 260 is not in operation. In this embodiment, since the primary process (e.g., DSD 260) crashed, there may be commands in flight (e.g., list of commands managing the driver). Since DSD 260 is not operating, these commands cannot be confirmed. In this embodiment, the driver 116 will replay both existing I_T_Nexuses, and still in progress SCSI commands (e.g., to be processed) to its new user space (e.g., SFD 280a). The secondary process will thus terminate and remove the in-flight commands from the list of commands managed by the driver 116, which will allow recovery actions by the initiator.

Figure 4C:
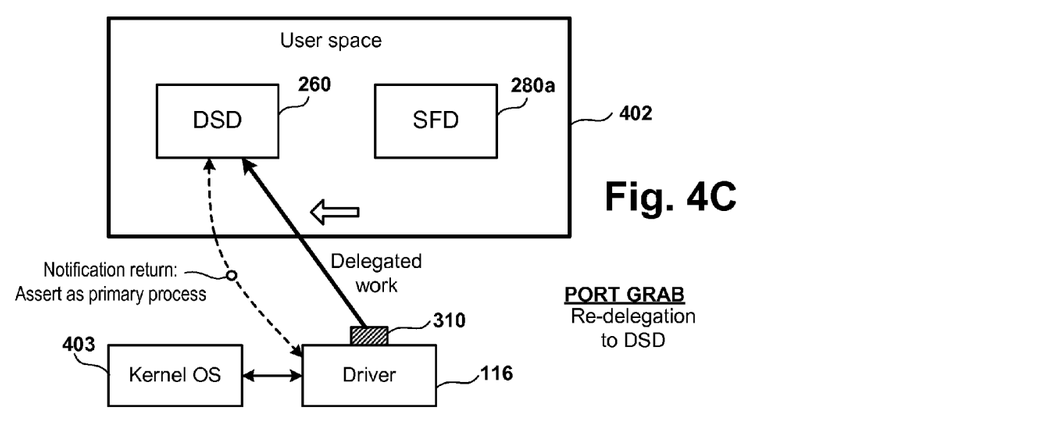

FIG. 4C illustrates the case where the DSD 260 returns to an active operating state. In this example, the DSD 260 will port grab the port 310, so that the work can be re-delegated to itself. In one embodiment, the DSD 260 will open the special file and assert itself as the primary process, and marks force=true. At this point, the driver 116 will delegate work to DSD 260. Just as is the case when delegation is made to SFD 280a, the in-flight commands need to be terminated by DSD 260. Terminating commands enables initiator(s) to be notified of command transmission failures and the initiators will perform standard re-sends to catch-up to the current sequence. As mentioned above, the primary process (e.g., DSD 260) is configured to process SCSI commands in accordance with ALUA Active/Optimized, while the secondary process (e.g., SFD 280a) is configured to process SCSI commands in accordance with ALUA transitioning.

Figure 5:
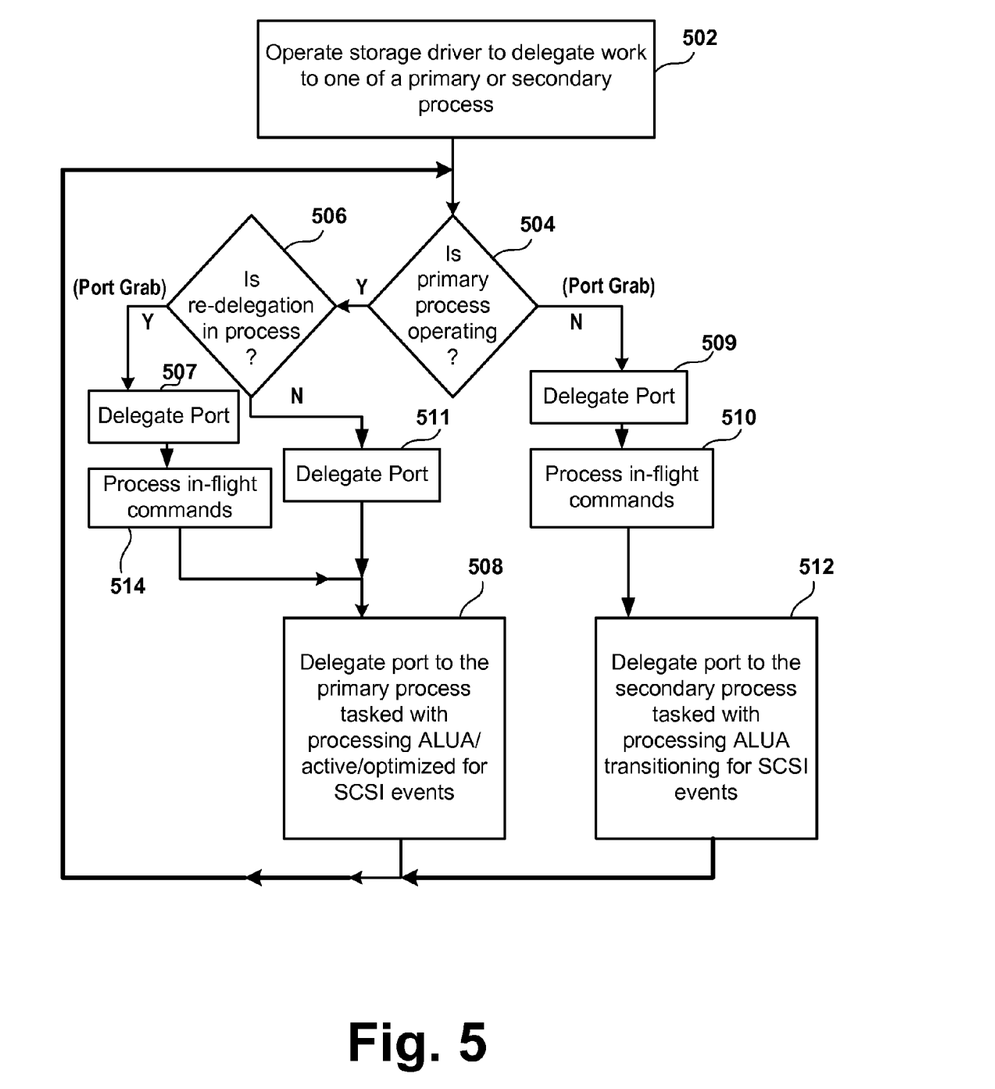
FIG. 5 illustrates a flowchart diagram that outlines exemplary processing performed between the coordination of a driver and user space processes used to execute storage operations in the context of a storage device that provides storage access to initiators, in accordance with one embodiment.

FIG. 5 illustrates a flowchart diagram that outlines exemplary processing performed between the coordination of a driver and user space processes used to execute storage operations in the context of a storage device that provides storage access to initiators. In this example, the storage device is a target for one or more initiators that are wishing to access data of the target (e.g., read and write data to storage). In operation 502, the storage driver is operating to delegate work to one of a primary or a secondary process. For purposes of example, the primary process is the DSD 260 and the secondary process is the SFD 280a. Further, the primary and secondary processes are configured to be user space processes that perform work that is delegated by the driver. In operation 504, it is determined if the primary process is operating.

The primary process is operating when, for example, the primary process has started up or has returned from a previous crash or downtime. In operation 506 it is determined if the primary process is coming back from a crash or downtime and the primary process is attempting re-delegation (port grab). If re-delegation is not in process in operation 506, the method proceeds to delegate the port to the primary process in operation 511 and then to operation 508 where the primary process is tasked with processing SCSI events. In one example, the SCSI events are processed in accordance with the ALUA standard, utilizing active/optimized. The primary process will therefore continue executing the work that is delegated to it by the driver.

If in operation 504 it is determined that the primary process is not operating, the driver will allow the secondary process to port grab, thus delegating the port 509 to the secondary process. In this example, the secondary process will process in-flight commands in operation 510. As mentioned above, processing in-flight commands includes replaying the commands that were previously to be processed by the primary process, and thus allowing the secondary process to terminate or service those commands. The secondary process will therefore be tasked with processing SCSI commands in accordance with ALUA transitioning.

In operation 504, it may be determined that the primary process is again operational. At this point, it is determined in operation 506 if a current transition is a re-delegation back to the primary process. Because the primary process is backed up and reasserting itself as the primary process, the primary process will perform a port grab and the port will be delegated to the primary process in operation 507. In operation 514 in-flight commands are then processed by the primary process, which acts to terminate the in-flight commands that were previously being processed by the secondary process. The method will then proceed to operation 508 where the primary process is tasked with processing the work delegated to it by the driver. Processing will therefore continue in this fashion to allow the secondary process to take over when the primary process has crashed or is down or is suspended for some reason. The port grab operations will therefore provide an interface to the initiators indicating that the port remains active. In addition, the existing I_T_Nexuses (connections from the initiator to the target) will also survive the transitions during port grabs. In general, an I_T_Nexus is simply a connection between an initiator and a target storage array.

Figure 6A:
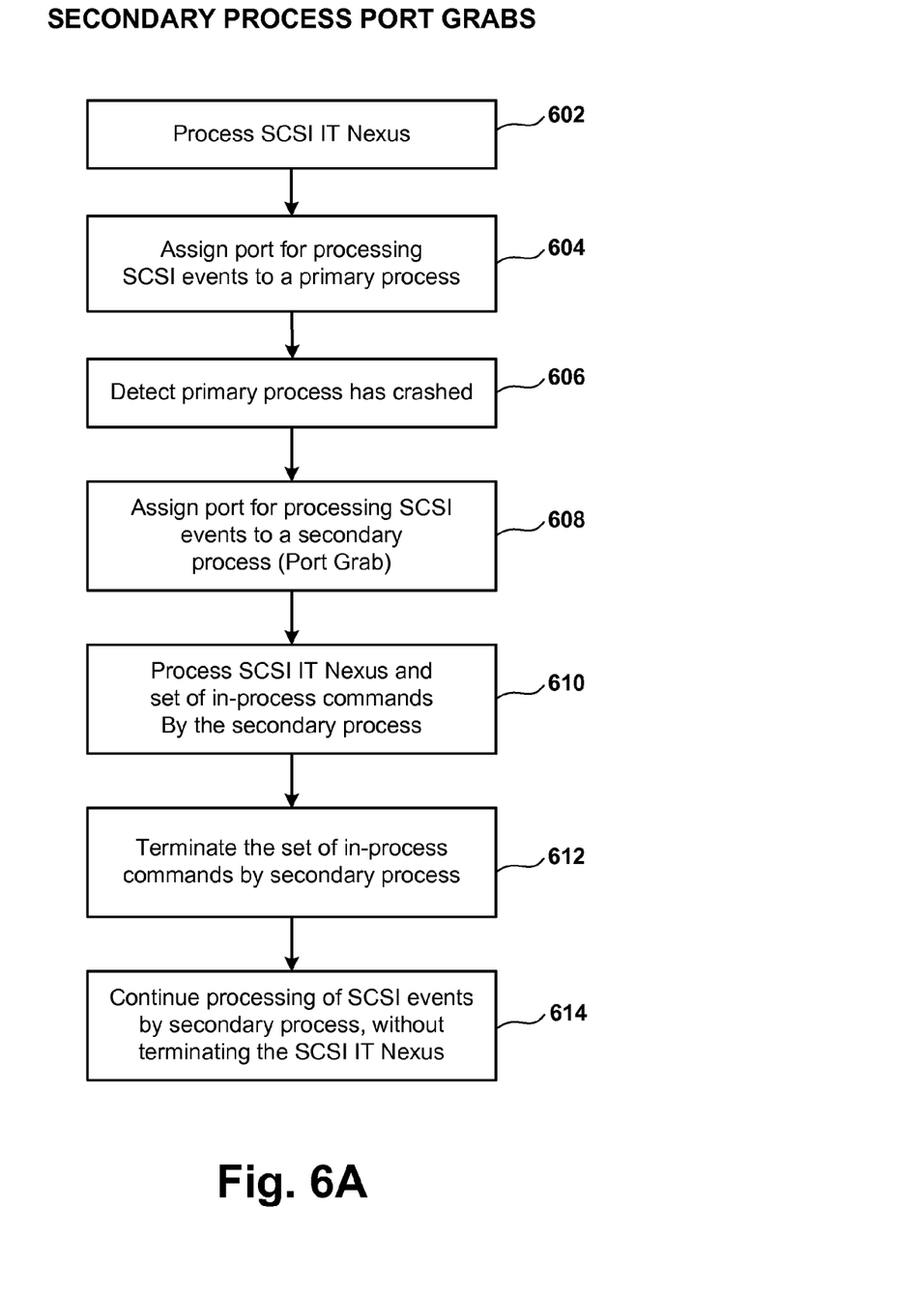
FIGS. 6A and 6B illustrate broad examples of processes for when port grabs are processed by secondary and primary processes, respectively, in accordance with one embodiment.

FIG. 6A illustrates an overview flowchart diagram describing operations that occur when a secondary process performs a port grab to take over processing from a primary process, without terminating SCSI IT Nexuses that may be active on the port. Operation 602 includes processing IT Nexus for one or more connections from initiators to a port of the target (storage device). When the storage device is operational and the primary process is also functioning and is providing work support to the driver of the storage device, the port is assigned for processing SCSI events to a primary process in operation 604. When the primary process is crashed and it is detected in operation 606, the port for processing SCSI events is then assigned to a secondary process in operation 608. This operation is referred to as a port grab by the secondary process.

In operation 610, the SCSI IT Nexus and the set of commands are processed by the secondary process. In operation 612, the set of in process commands are terminated by the secondary process. As noted above, terminating the in process commands, in one embodiment, is needed so that initiators can be informed that the commands will not be processed and the initiators can perform recovery processes to resend commands. In operation 614, processing SCSI events will therefore continue by the secondary process without terminating the SCSI IT Nexus, and also provides to initiators in appearance that the port has continued to be active even when the primary process has discontinued working.

Figure 6B:
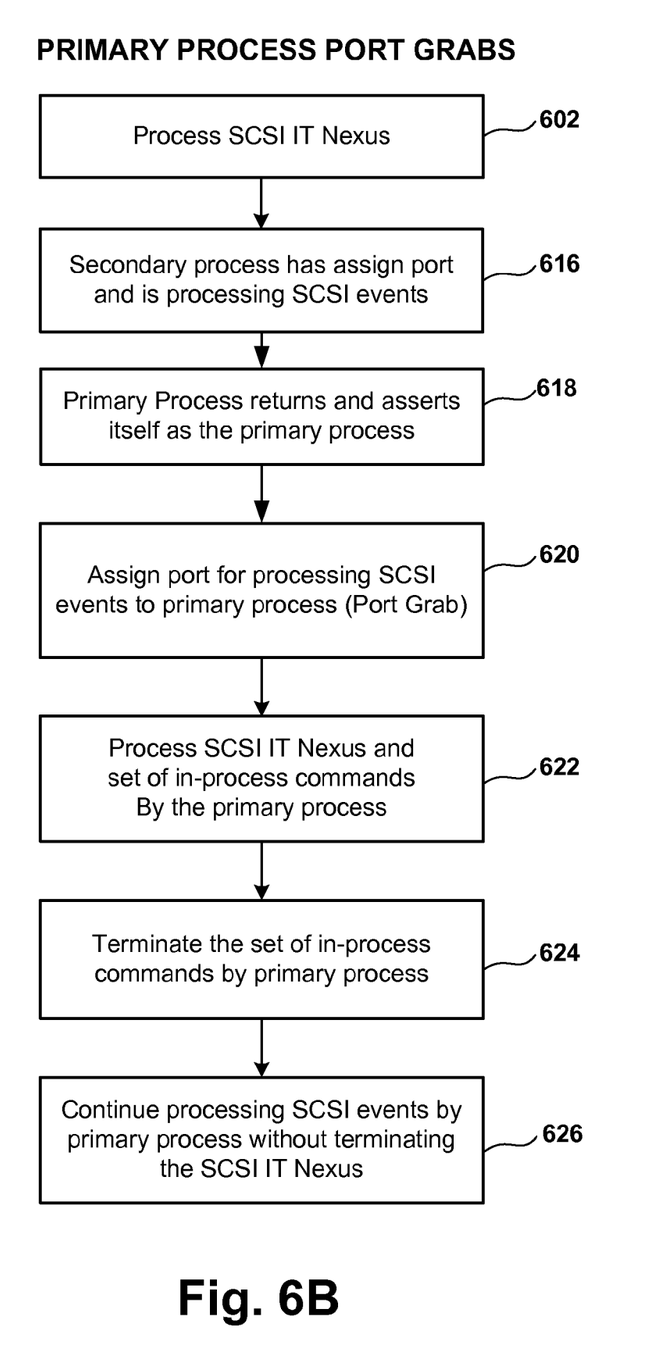

FIG. 6B illustrates an overview flowchart diagram describing operations that occur when a primary process returns and performs a port grab to take over processing from a secondary process, without terminating SCSI IT Nexuses that may be active on the port. In this operation, SCSI IT Nexuses are being processed in operation 602. As noted in operation 616, the secondary process has the assigned port and is processing SCSI events. In operation 618, the primary process returns and asserts itself as a primary process. The driver is configured to allow the primary process to take back the port because the primary process takes precedent over the secondary process whenever the primary process is active.

In operation 620, the port is assigned for processing SCSI events to the primary process, which entails a port grab by the primary process. In operation 622, the SCSI IT Nexus along with the set of in process commands, are processed by the primary process. In operation 624, the set of in process commands are terminated or serviced by the primary process. Similar to operation 612, the primary process needs to terminate the in process commands that the secondary process had been working on, to allow initiators to resend those commands to the primary process. In an alternative embodiment, instead of terminating commands, a response (e.g., BUSY) may be sent so that initiators can recover faster.

In operation 626, processing will continue for SCSI events by the primary process without terminating the SCSI IT Nexus, by way of the port grab operation.

Example Storage Array Infrastructure

In some embodiments, a plurality of storage arrays may be used in data center configurations or non-data center configurations. A data center may include a plurality of servers, a plurality of storage arrays, and combinations of servers and other storage. It should be understood that the exact configuration of the types of servers and storage arrays incorporated into specific implementations, enterprises, data centers, small office environments, business environments, and personal environments, will vary depending on the performance and storage needs of the configuration.

In some embodiments, servers may be virtualized utilizing virtualization techniques, such that operating systems can be mounted on hypervisors to allow hardware and other resources to be shared by specific applications. In virtualized environments, storage is also accessed by virtual hosts that provide services to the various applications and provide data and store data to storage. In such configurations, the storage arrays can be configured to service specific types of applications, and the storage functions can be optimized for the type of data being serviced.

For example, a variety of cloud-based applications are configured to service specific types of information. Some information requires that storage access times are sufficiently fast to service mission-critical processing, while other types of applications are designed for longer-term storage, archiving, and more infrequent accesses. As such, a storage array can be configured and programmed for optimization that allows servicing of various types of applications. In some embodiments, certain applications are assigned to respective volumes in a storage array. Each volume can then be optimized for the type of data that it will service.

As described above with reference to FIG. 2, the storage array 202 can include one or more controllers 220, 224. One controller serves as the active controller 220, while the other controller 224 functions as a backup controller (standby). For redundancy, if the active controller 220 were to fail, immediate transparent handoff of processing (i.e., fail-over) can be made to the standby controller 224. Each controller is therefore configured to access storage 1130, which in one embodiment includes hard disk drives (HDD) 226 and solid-state drives (SSD) 228. As mentioned above, SSDs 228 are utilized as a type of flash cache, which enables efficient reading of data stored to the storage 1130.

As used herein, SSDs functioning as "flash cache," should be understood to operate the SSD as a cache for block level data access, providing service to read operations instead of only reading from HDDs 226. Thus, if data is present in SSDs 228, reading will occur from the SSDs instead of requiring a read to the HDDs 226, which is a slower operation. As mentioned above, the storage operating system 106 is configured with an algorithm that allows for intelligent writing of certain data to the SSDs 228 (e.g., cache-worthy data), and all data is written directly to the HDDs 226 from NVRAM 218.

The algorithm, in one embodiment, is configured to select cache-worthy data for writing to the SSDs 228, in a manner that provides an increased likelihood that a read operation will access data from SSDs 228. In some embodiments, the algorithm is referred to as a cache accelerated sequential layout (CASL) architecture, which intelligently leverages unique properties of flash and disk to provide high performance and optimal use of capacity. In one embodiment, CASL caches "hot" active data onto SSD in real time—without the need to set complex policies. This way, the storage array can instantly respond to read requests—as much as ten times faster than traditional bolt-on or tiered approaches to flash caching.

For purposes of discussion and understanding, reference is made to CASL as being an algorithm processed by the storage OS. However, it should be understood that optimizations, modifications, additions, and subtractions to versions of CASL may take place from time to time. As such, reference to CASL should be understood to represent exemplary functionality, and the functionality may change from time to time, and may be modified to include or exclude features referenced herein or incorporated by reference herein. Still further, it should be understood that the embodiments described herein are just examples, and many more examples and/or implementations may be defined by combining elements and/or omitting elements described with reference to the claimed features.

In some implementations, SSDs 228 may be referred to as flash, or flash cache, or flash-based memory cache, or flash drives, storage flash, or simply cache. Consistent with the use of these terms, in the context of storage array 102, the various implementations of SSD 228 provide block level caching to storage, as opposed to instruction level caching. As mentioned above, one functionality enabled by algorithms of the storage OS 106 is to provide storage of cache-worthy block level data to the SSDs, so that subsequent read operations are optimized (i.e., reads that are likely to hit the flash cache will be stored to SSDs 228, as a form of storage caching, to accelerate the performance of the storage array 102).

In one embodiment, it should be understood that the "block level processing" of SSDs 228, serving as storage cache, is different than "instruction level processing," which is a common function in microprocessor environments. In one example, microprocessor environments utilize main memory, and various levels of cache memory (e.g., L1, L2, etc). Instruction level caching, is differentiated further, because instruction level caching is block-agnostic, meaning that instruction level caching is not aware of what type of application is producing or requesting the data processed by the microprocessor. Generally speaking, the microprocessor is required to treat all instruction level caching equally, without discriminating or differentiating processing of different types of applications.

In the various implementations described herein, the storage caching facilitated by SSDs 228 is implemented by algorithms exercised by the storage OS 106, which can differentiate between the types of blocks being processed for each type of application or applications. That is, block data being written to storage 1130 can be associated with block data specific applications. For instance, one application may be a mail system application, while another application may be a financial database application, and yet another may be for a website-hosting application. Each application can have different storage accessing patterns and/or requirements. In accordance with several embodiments described herein, block data (e.g., associated with the specific applications) can be treated differently when processed by the algorithms executed by the storage OS 106, for efficient use of flash cache 228.

Continuing with the example of FIG. 2, that active controller 220 is shown including various components that enable efficient processing of storage block reads and writes. As mentioned above, the controller may include an input output (I/O) 210, which can enable one or more machines to access functionality of the storage array 202. This access can provide direct access to the storage array, instead of accessing the storage array over a network. Direct access to the storage array is, in some embodiments, utilized to run diagnostics, implement settings, implement storage updates, change software configurations, and/or combinations thereof. As shown, the CPU 208 is communicating with storage OS 106.

One or more embodiments can also be fabricated as computer readable code on a non-transitory computer readable storage medium. The non-transitory computer readable storage medium is any non-transitory data storage device that can store data, which can thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments and sample appended claims.

The invention claimed is:

1. A storage array, comprising,
a controller of the storage array configured to operate a Fibre Channel protocol, the controller including memory and a processor,
the processor is configured to execute a driver and user-space processes that include a primary process and a secondary process, the user-space processes are configured to process SCSI events for the driver to service one or more IT Nexus connections for one or more initiators, wherein a port of the driver is assigned to the primary process to execute input/output (I/O) requests to the storage array from the one or more initiators, wherein when the primary process fails to operate the secondary process performs a port grab of the port and the driver allows the secondary process to perform the port grab since the primary process is not operational,
wherein the secondary process executes limited requests that do not include I/O requests to the storage array;
wherein the port grab by the secondary process maintains the one or more IT Nexus connections active between the storage array and the one or more initiators.

2. The storage array of claim 1,
wherein the processor is configured to enable the primary process to become operational, the return of the primary process acting to force a port grab by the primary process;
wherein the port grab by the secondary process maintains the one or more IT Nexus connections active between the storage array and the one or more initiators.

3. The storage array of claim 2, wherein the primary process terminates in-process commands that had been intended for the secondary process, wherein terminating the in-process commands enables the one or more initiators to perform recovery actions that cause a resending of the in-process commands to the primary process for handling.

4. The storage array of claim 2, wherein the driver advertises a file through which the driver communicates with the primary process,
wherein the primary process writes code to the file to force the port grab by the primary process; and
wherein the secondary process writes code to the file to request the port grab by the secondary process when the primary process is not operational.

5. The storage array of claim 1, wherein the secondary process terminates in-process commands that had been intended for the primary process, wherein terminating the in-process commands enables the one or more initiators to perform recovery actions that cause a resending of the in-process commands to the secondary process for handling.

6. The storage array of claim 1, wherein the secondary process processes in-process commands that had been intended for the primary process, wherein processing the in-process commands enables the one or more initiators to perform recovery actions.

7. The storage array of claim 1, further comprising,
a Fibre Channel (FC) card for connecting to an FC fabric, the FC card being in communication with the driver of the controller and the FC fabric provides interconnection to the one or more initiators.

8. The storage array of claim 1, further comprising,
wherein the primary process execute input/output (I/O) requests using an asymmetric logical unit access (ALUA) active/optimized process; and
wherein the limited requests executed by the secondary process use an ALUA transitioning process.

9. A method for processing failover operations in a storage array configured for Fibre Channel communication, comprising:
executing a primary process in user space of a controller of the storage array, the primary process configured to process request commands from one or more initiators via one or more connections, the primary process connecting to a port of the storage array when in operation;
executing a secondary process in the user space of the controller, the secondary process configured to process request commands from one or more of the initiators, and the secondary process not having a connection to the port when the primary process is in operation;
detecting that the primary process has entered a state of non-operation, and in response allowing the secondary process to perform a port grab of the port while maintaining the one or more connections;
resuming execution by the secondary process while the primary process is in the non-operation state;
causing a replay of in-progress commands that were to be executed by the primary process before entering the state of non-operation; and
deleting the in-progress commands before resuming execution by the secondary process.

10. The method of claim 9, further comprising,
detecting that the primary process has returned from the state of non-operation, wherein the primary process forces a port grab of the port while maintaining the one or more connections;
resuming execution by the primary process.

11. The method of claim 10,
wherein the primary process is configured to execute input/output (I/O) requests using an asymmetric logical unit access (ALUA) active/optimized process; and
wherein limited requests are executed by the secondary process using an ALUA transitioning process.

12. The method of claim 10, wherein a driver of the controller is configured to manage the port, the driver is further configured to delegate operations to the primary process and the secondary process, depending on which has control of the port, further comprising,
advertising, by the driver, a file through which the driver communicates with the primary process,
wherein the primary process writes code to the file to force the port grab by the primary process; and
wherein the secondary process writes code to the file to request the port grab by the secondary process when the primary process is not operational.

13. The method of claim 12, further comprising,
replaying in-progress commands, by the driver, after the port grab by the secondary process or the primary process; and terminating the in-progress commands before resuming execution by either the secondary process or the primary process.

14. The method of claim 9, wherein the one or more connections are IT_Nexus connections of a Fibre Channel storage network.

15. A method for processing failover operations in a storage array configured for Fibre Channel communication, comprising:
    executing a primary process in user space of a controller of the storage array, the primary process configured to process request commands from one or more initiators, the primary process having access to a volume manager for serving data input/output (I/O) requests, and the primary process having a connection to a port of the storage array when in operation;
    executing a secondary process in the user space of the controller, the secondary process configured to process request commands from one or more of the initiators, the secondary process not having access to the volume manger and having access to data for responding to non-I/O requests, and the secondary process not having a connection to the port when the primary process is in operation;
    detecting, by the secondary process, that the primary process has entered a state of non-operation, and in response performing a port grab of the port by the secondary process;
    causing a replay of in-progress commands that were to be executed by the primary process before entering the state of non-operation;
    deleting the in-progress commands; and
    continuing to execute the secondary process while the primary process is the non-operation state.

16. The method of claim 15, wherein when the primary process returns to operation, the method includes,
    performing a port grab of the port by the primary process;
    causing a replay of in-progress commands that were to be executed by the secondary process before the port grab by the primary process;
    deleting the in-progress commands of the secondary process; and
    continuing to execute the primary process.

17. The method of claim 15, wherein the controller is an active controller that processes each of the primary process and the secondary process.

18. The method of claim 15, wherein the port is provided by a driver of the controller, and the driver serves as a target-side endpoint for one or more SCSI IT Nexus handled by the port.

19. A storage system, comprising,
    an active controller having program instructions for,
    executing a primary process in user space of the active controller, the primary process configured to process request commands from one or more initiators, the primary process having access to a volume manager for serving data input/output (I/O) requests, and the primary process having a connection to a port of storage system when in operation;
    executing a secondary process in the user space of the controller, the secondary process configured to process request commands from one or more of the initiators, the secondary process not having access to the volume manger and having access to data for responding to non-I/O requests, and the secondary process not having a connection to the port when the primary process is in operation;
    detecting, by the secondary process, that the primary process has entered a state of non-operation, and in response performing a port grab of the port by the secondary process;
    causing a replay of in-progress commands that were being executed by the primary process before entering the state of non-operation;
    deleting the in-progress commands; and
    continuing to execute the secondary process while the primary process is in the non-operation state.

20. Computer program instructions stored on non-transitory storage, the computer program instructions configured to process failover operations in a storage array configured for Fibre Channel communication, comprising:
    instructions for executing a primary process in user space of a controller of the storage array, the primary process configured to process request commands from one or more initiators via one or more connections, the primary process connecting to a port of the storage array when in operation;
    instructions for executing a secondary process in the user space of the controller, the secondary process configured to process request commands from one or more of the initiators, and the secondary process not having a connection to the port when the primary process is in operation;
    instructions for detecting that the primary process has entered a state of non-operation, and in response allowing the secondary process to perform a port grab of the port while maintaining the one or more connections;
    instructions for resuming execution by the secondary process while the primary process is the non-operation state;
    instructions for causing a replay of in-progress commands that were to be executed by the primary process before entering the state of non-operation; and
    instructions for deleting the in-progress commands before resuming execution by the secondary process.

21. The computer program instructions of claim 20, further comprising,
    instructions for detecting that the primary process has returned from the state of non-operation, wherein the primary process forces a port grab of the port while maintaining the one or more connections;
    instructions for resuming execution by the primary process.

22. The computer program instructions of claim 20,
    wherein the primary process is configured to execute input/output (I/O) requests using an asymmetric logical unit access (ALUA) active/optimized process; and
    wherein limited requests are executed by the secondary process using an ALUA transitioning process.

23. The computer program instructions of claim 20, wherein a driver of the controller is configured to manage the port, the driver is further configured to delegate operations to the primary process and the secondary process, depending on which has control of the port, further comprising,
    instructions for advertising, by the driver, a file through which the driver communicates with the primary process,
    wherein the primary process writes code to the file to force the port grab by the primary process; and
    wherein the secondary process writes code to the file to request the port grab by the secondary process when the primary process is not operational.

* * * * *